United States Patent [19]

Motrenec et al.

[11] Patent Number: 5,516,133
[45] Date of Patent: May 14, 1996

[54] STEERING STABILIZER FOR BICYCLES

[75] Inventors: Donald L. Motrenec, Huntington Beach; Ronald A. Motrenec, Rowland Heights, both of Calif.

[73] Assignee: Stabletec, Inc., Huntington Beach, Calif.

[21] Appl. No.: 285,710

[22] Filed: Aug. 4, 1994

[51] Int. Cl.⁶ ................................................. B62K 21/08
[52] U.S. Cl. ............................ 280/272; 280/90; 188/306; 188/310
[58] Field of Search .................................. 280/293, 272, 280/276, 279, 89, 90, 282; 188/306, 308, 309, 310

[56] References Cited

U.S. PATENT DOCUMENTS

| | | | |
|---|---|---|---|
| 940,783 | 11/1909 | Buckland | 280/271 |
| 4,736,962 | 4/1988 | Motrenec | 188/290 X |
| 4,773,514 | 9/1988 | Gustafsson | 188/306 |
| 4,893,700 | 1/1990 | Gramss | 188/306 |
| 5,275,264 | 1/1994 | Isella | 280/276 X |

FOREIGN PATENT DOCUMENTS 0607720  11/1927  France ....................... 280/271

*Primary Examiner*—Eric D. Culbreth
*Assistant Examiner*—Victor E. Johnson
*Attorney, Agent, or Firm*—Edgar W. Averill, Jr.

[57] ABSTRACT

A steering stabilizer for bicycles utilizing a hydraulic fluid. A stabilizer body is secured to the frame of the bicycle. The stabilizer body has a hydraulic reservoir which is in the shape of an arc. A vane is supported by the stem of the bicycle which turns with the handlebars and the arcuate shaped opening is filled with a hydraulic fluid. As the handlebars are turned, the stem turns the stem vane and produces a resistance to turning. Preferably this resistance is variable by the placement of a valve between the two volumes on each side of the stem vane.

9 Claims, 4 Drawing Sheets

STEERING STABILIZER FOR BICYCLES

BACKGROUND OF THE DISCLOSURE

The field of the invention is wheeled vehicles and the invention relates more particularly to vehicles which have a front wheel operated by handlebars.

Applicant has several patents on the subject of steering stabilizers. One patent is U.S. Pat. No. 4,558,878 which utilizes a piston which moves up and down on threads as the handlebars are turned. Another steering stabilizer is shown in applicant's U.S. Pat. No. 4,736,962. This patent utilizes a fixed vane and a variable vane. One vane is fixed to the frame and the other vane is fixed to the stem.

Another steering stabilizer is shown in U.S. Pat. No. 4,773,514 which utilizes a vane supported by the frame which is held in an arcuate reservoir which is supported by the handlebars.

Various other vane operated hydraulic members are shown in U.S. Pat. Nos. 1,957,997 and 4,893,700. A very early steering stabilizer which utilizes friction is shown in U.S. Pat. No. 582,279.

One style of bicycle which is growing rapidly is referred to as a "mountain bicycle". This bicycle is often used in rough terrain. Occasionally the front wheel will strike a rut or a small crevice and cause the rider to lose control. The steering stabilizers of the type set forth in applicant's earlier patents are basically designed for use on motorcycles or all terrain vehicles, but the same action would be useful for mountain bicycles. Unfortunately, these earlier devices are relatively heavy and mountain bicycles are designed to be very sturdy but also to be very light. Furthermore, the mountain bicycle has a relatively small frame as compared to a motorcycle or all terrain vehicle and the prior art stabilizers have no place to be mounted on a mountain bike. Furthermore, it is desirable that a stabilizer useful for mountain bicycles can be added to an existing mountain bicycle without any change to the frame or stem thereof so that it can be used as an accessory or add-on feature.

SUMMARY OF THE INVENTION

It is an object of the present invention to provide a steering stabilizer for mountain bicycles which is light in weight and relatively small in size and which can be added as an after market accessory.

The present invention is for a steering stabilizer for bicycles which have a frame including a top tube, a head tube which rotatingly supports the stem assembly, including the stem tube and stem, and handlebars. The steering stabilizer comprises a stabilizer body having an arcuate shaped opening which surrounds at least a portion of the stem assembly, said stabilizer body being secured against rotation by the frame and said arcuate opening having a wall and a floor, an outer surface and a top surface. The arcuate shaped opening forms a hydraulic oil reservoir. A stem vane member is rotatingly held in the arcuate shaped opening. The stem vane member has an opening which surrounds a portion of the stem assembly and has a stem vane separated from the outer surface of the arcuate shaped opening. Said stem vane member is secured against rotation with respect to said stem assembly and said stem vane and said wall dividing said hydraulic oil reservoir into first and second variable volumes. As the stem turns in a first direction, the first variable volume decreases and the second variable volume increases. As the stem turns in a second direction, the first variable volume increases and the second variable volume has a concomitant decrease. Means are provided for permitting the hydraulic oil to flow between the first and second variable volumes as the stem turns. Preferably, an adjustable valve is provided to control the flow rate of hydraulic oil between the first and second variable volumes. Also preferably the stabilizer vane is supported on a flat disk and the wall of the arcuate shaped opening is held on a ring positioned over the flat disk. It is also preferred that the valve be adjustable by a lever held on the handlebars and connected to the stabilizer assembly by a cable.

DESCRIPTION OF THE PREFERRED EMBODIMENTS

Figure 1:
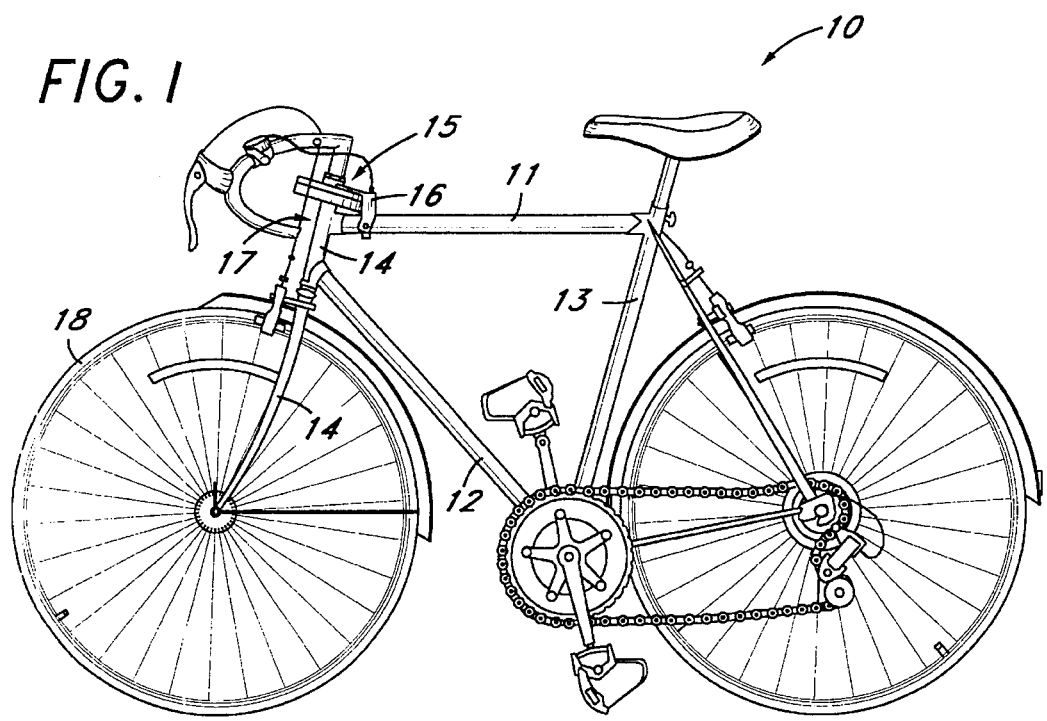
FIG. 1 is a side view of a bicycle including the steering stabilizer of the present invention.

A bicycle is shown in FIG. 1 and indicated generally by reference character 10. Bicycle 10 has a frame which includes a top tube 11, a down tube 12, a seat tube 13, and a head tube 14. A steering stabilizer 15 is secured by a bracket 16 to top tube 11. Steering stabilizer 15 surrounds stem assembly 17 as described in more detail below. The steering stabilizer provides a hydraulic drag against any jarring turn of the front wheel 18 which is transmitted through forks 19, stem assembly 17 to the handlebars 20.

Figure 2:
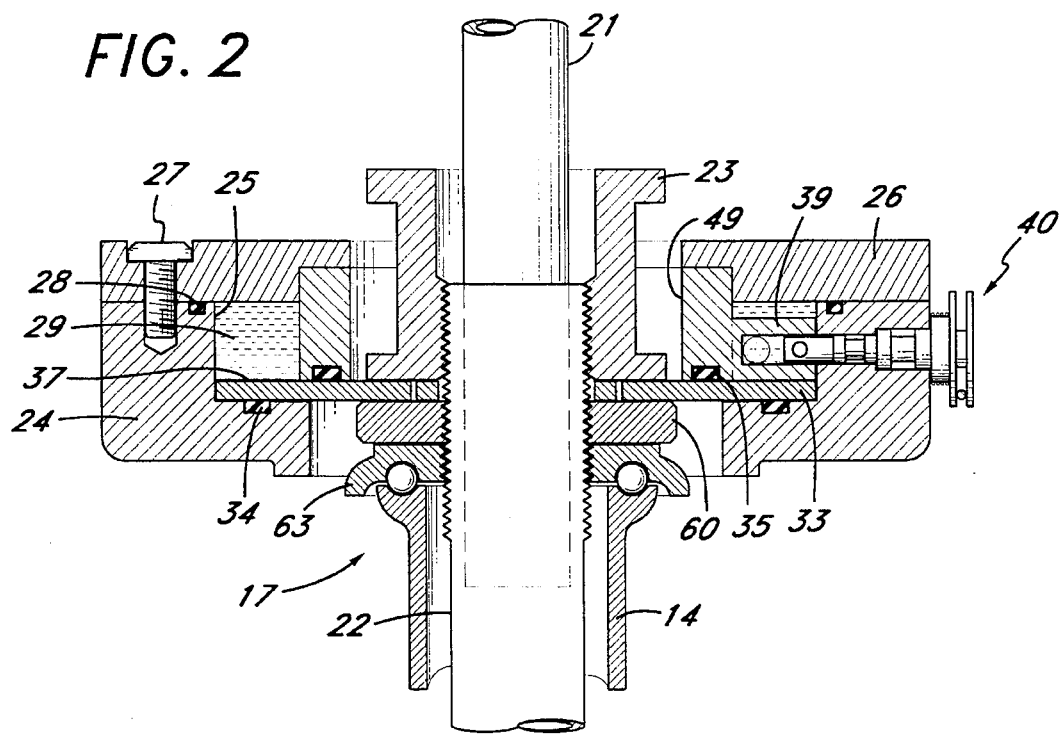
FIG. 2 is an enlarged cross sectional view of the steering stabilizer shown on the bicycle of FIG. 1.

The steering stabilizer 15 is shown in cross sectional view in FIG. 2 where the stem assembly 17 can be seen to include a stem 21 supported in a stem tube 22 in a conventional manner by stem nut 23. Stem nut 23 is, however, not the conventional design and is extended in height so that it may be tightened or loosened above stabilizer 15. Steering stabilizer 15 has a stabilizer body 24 which contains an arcuate or ring shaped opening 25. Opening 25 has a top 26 which is preferably sealed thereto by a series of screws 27 and an O-ring 28. A hydraulic fluid 29 is secured in opening 25.

Figure 6:
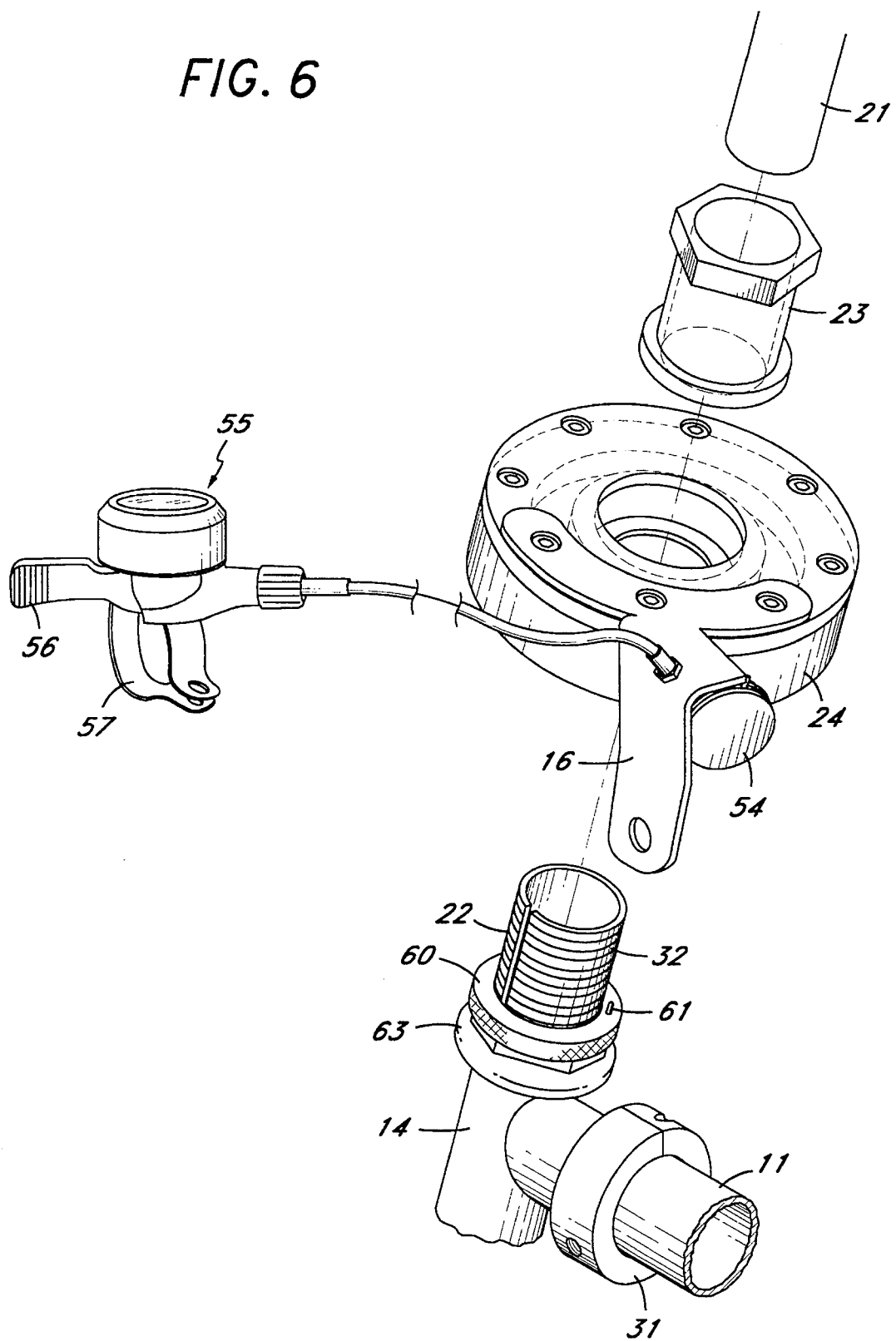
FIG. 6 is an exploded perspective view of the steering stabilizer shown on the bicycle of FIG. 1.

As shown best in FIG. 6, body 24 is secured to top tube 11 by bracket 16 which in turn is held in clamp 31. Also, as shown in FIG. 6, stem tube 22 has a threaded portion 32 on which stem nut 23 is tightened to hold stem 21 in place. These, except for the stem nut 23, are the conventional parts which need not be changed for affixing the steering stabilizer of the present invention.

Returning to FIG. 2, stem nut 23 and stem tube 22, of course, turn with handlebars 20 and stem 21. The stabilizer body 24 does not turn with these parts of the stem assembly since it is secured to the frame. Thus, there is a relative turning between stem valve member or disk 33 and the stabilizer body 24. Disk 33 is sealed to prevent the leakage of hydraulic fluid by O-rings 34 and the floor 36 of body 24. O-ring 35 rides along the upper surface 37 of disk 33. Disk 33 supports stem vane member 38.

Figure 5:
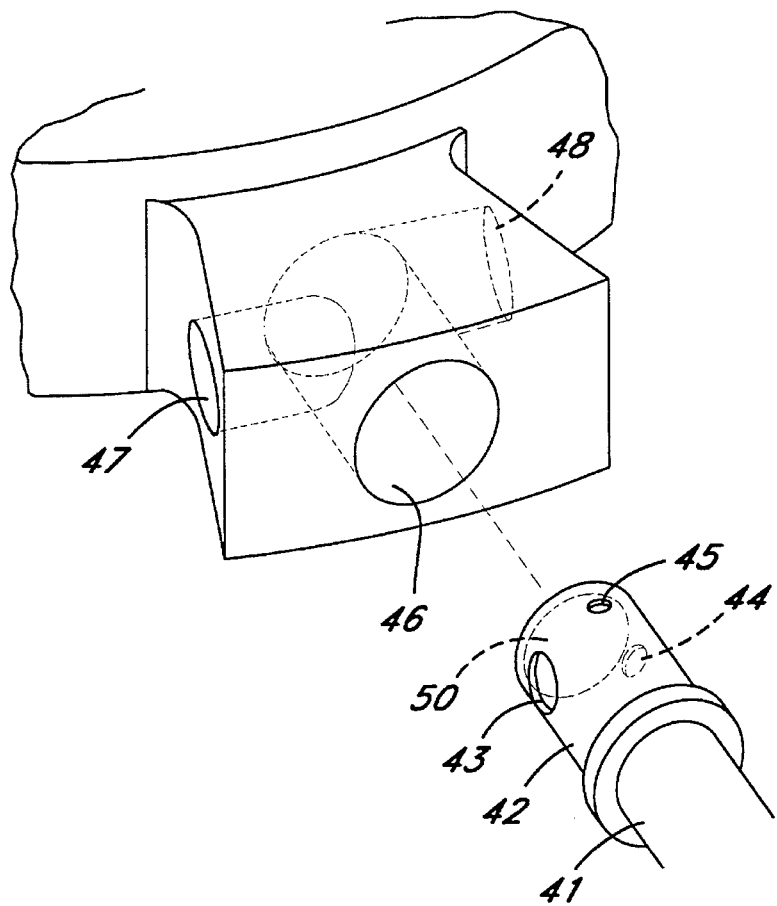
FIG. 5 is an enlarged exploded view of the variable valve of the steering stabilizer of FIG. 2.

A frame vane ring 49 supports a frame vane 39 and is secured so that it does not move with respect to body 24 or is preferably formed integrally with top 26. A threaded bearing securement nut 60 is tightened over upper race member 63. A dowel pin 61 passes into one of the pin holes 62 adjacent stem opening 64 in stem vane disk 33. It also is possible that a key (not shown) be formed on the inner surface of disk 33 which would fit into the keyway which is normally formed at the top of the fork assembly. Valve means 40 are provided to control the flow of hydraulic fluid through a fluid passageway shown best in FIG. 5. In FIG. 5 the valve stem 41 holds valve body 42 which in turn has three openings, 43, 44 and 45, which all lead to a central passageway 50. This operates when the valve body is inserted into the valve support cylinder 46 and oil may pass through oil passageways 47 and 48 and through any one of the openings 43, 44 and 45. Of course, other valve means can also be used, but this design permits three distinct degrees of stabilization.

Figure 4:
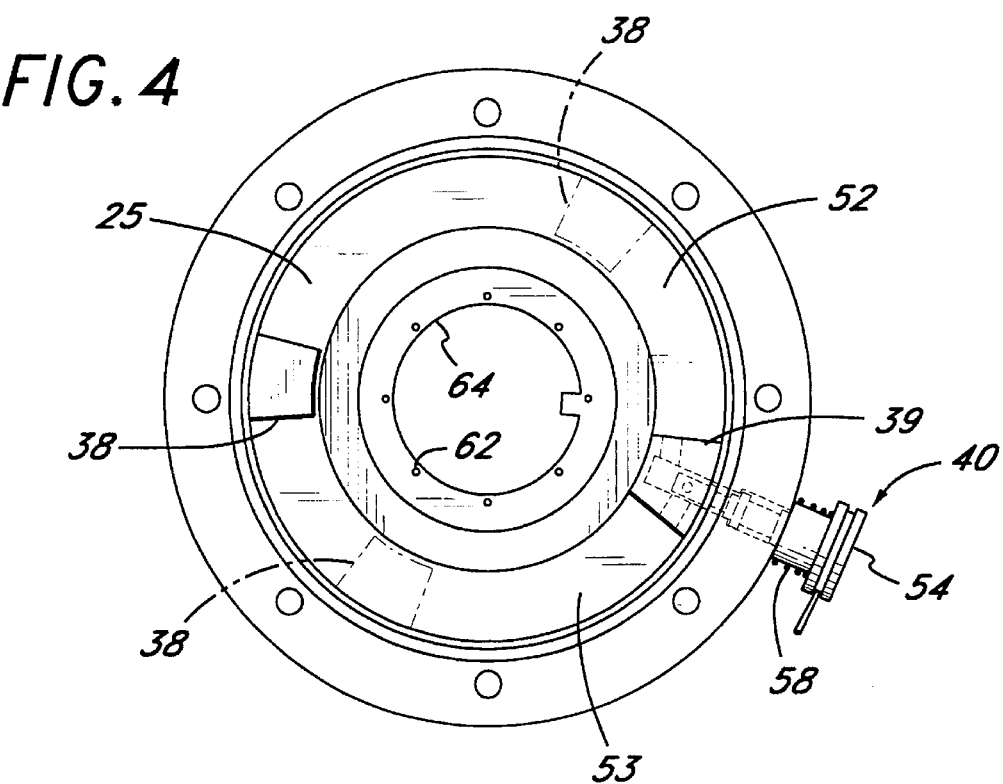
FIG. 4 is a top view taken along line 4—4 of FIG. 3.

Turning now to the view of FIG. 4, it can be seen that the frame vane 39 provides a wall of the arcuate or ring shaped opening 25. Typically in production the frame vane member 39 will be integral with top 26. As the handlebars are turned the stem vane 38 moves oil between a first variable volume 52 and a second variable volume 53 as shown in FIG. 4. Thus, when the handlebars are turned left, stem vane 38 moves to the left or counter clockwise, reducing the size of second variable volume 53 and increasing the size of first variable volume 52. The oil passes between these two volumes by passing through frame vane 39. As shown best in FIG. 6, valve means 40 has a cable ring 54 which is controlled by cable control assembly 55 by moving lever 56 in a conventional manner. Cable control assembly 55 is clamped to handlebars 20 by clamp 57 and the cable assembly cable is also held by bracket 16.

Returning now to FIG. 4 it can be seen that cable ring 54 also includes a spring 58 which assists in the control operation by returning the valve to a fully open position when the cable is released.

Figure 3:
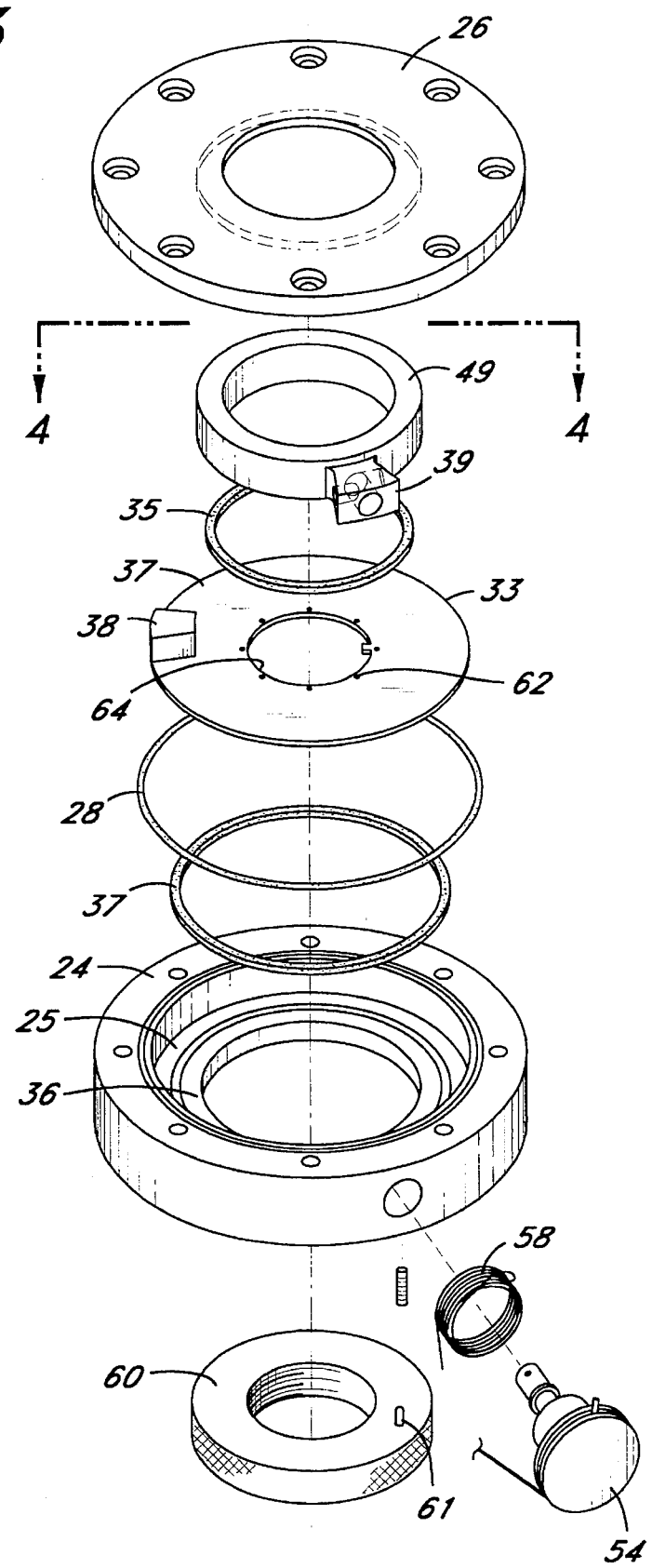
FIG. 3 is an exploded perspective view of the steering stabilizer of FIG. 2.

To further assist in understanding the operation of the stabilizer of the present invention, the only element of the stabilizer portion shown in FIG. 3 which does not remain stable with the bicycle frame, is stem vane member or disk 33 with its stem vane 38.

The device of the present invention may be fabricated in many different ways to reduce production costs. For instance, the frame vane 39 may be integral with the cover 26. Also, the arcuate or ring shaped opening need not cover almost 360° but instead need only be about 180° to permit relatively full turning of the handlebars. It is for this reason the term "arc" rather than "ring" has been used. The essential feature of the present invention is its positioning well below the handlebars and preferably near the top tube. In this way there is no need for any long attachment arm and it also provides a very free area for such attachment. The stabilizer may be made from aluminum or injection molded from a polymeric material to provide light weight. The hydraulic oil should be a relatively light weight oil such as 2½ wt. motorcycle oil.

The device of the present invention can be easily added to an existing bicycle without the necessity of replacing any expensive parts of the bicycle. The cable control assembly 55 may be placed in a convenient location on handlebars 20 so that the amount of stabilization can be adjusted for all riding conditions. If the bicycle was being used over cobblestones or other such road surfaces, the valve would be closed to increase the resistance to turning to greatly increase the control of a bicycle under such conditions.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. A steering stabilizer for bicycles which have a frame including a top tube and a head tube which rotatingly supports a stem assembly including a stem tube and a stem, and handlebars, said steering stabilizer comprising:

a stabilizer body having an arcuate shaped opening which surrounds at least a portion of the stem assembly, said stabilizer body being secured against rotation with respect to the frame by attachment to the frame and said arcuate shaped opening having an end wall and a floor, an outer surface, and a top surface, said arcuate shaped opening forming a hydraulic oil reservoir;

a stem vane member rotatingly held in said arcuate shaped opening, said stem vane member having a stem opening which surrounds a portion of the stem assembly and said stem vane member has a stem vane separated from the outer surface of the arcuate shaped opening and from the stem opening and said stem vane member being secured against rotation with respect to said stem assembly and said stem vane and said wall dividing said hydraulic oil reservoir into first and second variable volumes and as the stem turns in a first direction, the first variable volume decreases and the second variable volume increases and as the stem turns in a second direction, the first variable volume increases and the second variable volume has a concomitant decrease; and means for permitting hydraulic oil to flow between said first and second variable volumes as the stem turns.

2. A steering stabilizer for bicycles which have a frame including a top tube and a head tube which rotatingly supports a stem assembly including a stem tube and a stem, and handlebars, said steering stabilizer comprising:

a stabilizer body having a ring shaped opening which surrounds a portion of the stem assembly, said stabilizer body being secured against rotation with respect to the frame by attachment to the frame and said ring shaped opening having a frame vane secured to the stabilizer body and said ring shaped opening having a floor, an outer surface, and a top surface;

a stem vane disk rotatingly held in said ring shaped opening, said stem vane disk having an upper surface and a lower surface which lower surface is rotatingly sealed to said floor of said ring shaped opening to form a hydraulic oil reservoir and said stem vane disk having a stem vane extending upwardly from the upper surface of said stem vane disk and said stem vane disk being secured against rotation with respect to said stem assembly and said stem vane and said frame vane dividing said hydraulic oil reservoir into first and second variable volumes and as the stem assembly turns in a first direction, the first variable volume decreases and the second variable volume increases and as the stem assembly turns in a second direction, the first variable volume increases and the second variable has a concomitant decrease; and means for permitting hydraulic oil to flow between said first and second variable volumes as the stem assembly turns.

3. The steering stabilizer for bicycles of claim 2 wherein said means for permitting hydraulic oil to flow between said first and second variable volumes is an adjustable valve.

4. The steering stabilizer for bicycles of claim 3 wherein said adjustable valve is in said frame vane.

5. The steering stabilizer for bicycles of claim 4 wherein said adjustable valve is operable from a lever affixed to said handlebars.

6. The steering stabilizer for bicycles of claim 2 wherein said frame vane is positioned on the outer surface of a ring which has an inner surface which forms the inner surface of said hydraulic oil reservoir and which ring has an upper surface sealed to the top surface of the hydraulic oil reservoir and a bottom surface slidingly sealed to said stem vane disk.

7. The steering stabilizer for bicycles of claim 3 wherein said adjustable valve includes a valve stem which extends outwardly from said stabilizer body.

8. The steering stabilizer for bicycles of claim 7 wherein said valve stem is adjustable by the movement of a cable.

9. The steering stabilizer for bicycles of claim 2 wherein said stabilizer body is clamped to said top tube.

* * * * *